Sept. 26, 1939.  C. LUCKHAUPT  2,173,882
METHOD OF TREATING POROUS MATERIALS AND RESULTING PRODUCTS
Filed Nov. 30, 1936
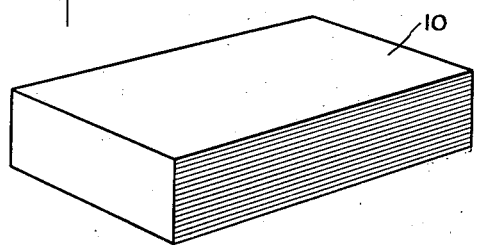
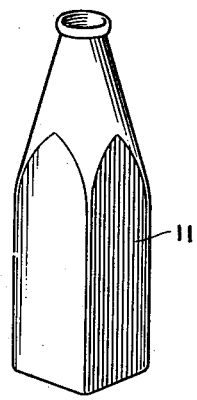
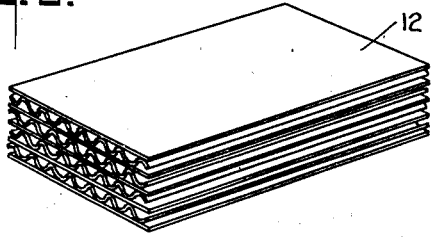
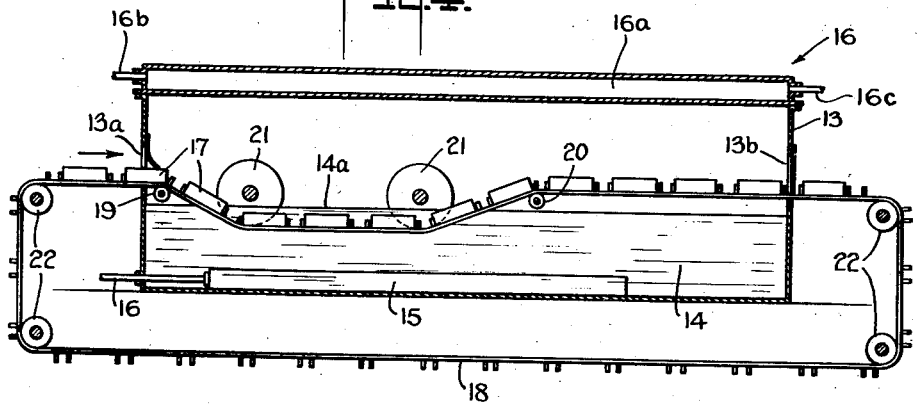
INVENTOR
Christopher Luckhaupt
HIS ATTORNEY Patented Sept. 26, 1939

2,173,882

UNITED STATES PATENT OFFICE 2,173,882

METHOD OF TREATING POROUS MATERIALS AND RESULTING PRODUCTS

Christopher Luckhaupt, Jamaica, N. Y.

Application November 30, 1936, Serial No. 113,463

8 Claims. (Cl. 91—70)

The present invention relates to the method of treating porous material and resulting product.

Generally stated, my present invention comprises the treatment of cellulose matter and other suitable porous matter, natural and synthetic, with terpin hydrate admixed with what I term "fortifiers", triphenol phosphate in particular, pursuant to my present invention; with or without therewith combining other ingredients, whereby such treated matter is enhanced in hardness, tensile strength, compressional strength and flexural strength, thereby enhanced in resistance against tearing, chipping, cracking and other rupture, and has imparted thereto additional desirable characteristics such as proofness against absorption relative to oil, beer, wine, whiskey and other alcohol containing fluids, milk and other liquid or liquid containing food, imparted by certain fortifiers in conjuncture with terpin hydrate, and/or fire retardency or attribute of non-support of combustion, imparted by certain fortifiers in conjunction with terpin hydrate.

My invention comprises, in general, the treatment of cellulose and kindred matter by subjecting the same in suitable relation with terpin hydrate and suitable fortifier or fortifiers, i. e., triphenyl phosphate with or without therewith combining other ingredients, pursuant to my present invention, as by immersion in a suitable bath of the stated treatment material, or by subjecting such matter to a spray of such treatment material.

The above and other favorable attributes are attained by the treatment material impregnating the treated material, accompanied, inter alia, by the displacement of water, and other aqueous content from the treated matter, the degree of the stated impregnation of the treatment material and the dispelling of aqueous content from the treated matter being regulated by extent and/or period of submersion or subjection, the proportional quantities of the fortifier or fortifiers, the temperature of the treatment and other factors of the treatment as will become apparent.

Additive to the above attributes, the flexibility or other flexural characteristics of the treated matter is regulated by the proportional content of the fortifier employed in the treatment material, and similarly with respect to other attributes enhanced or imparted to the treated matter.

More specifically, the cellulose and other porous matter, natural and synthetic, are subjected to terpin hydrate and one or more fortifiers, as by immersion in a bath of the stated treatment material or to a spray of such treatment material at a treatment temperature at or above the melting point of such treatment material, viz at or above 115° C., such cellulose or other porous matter being insoluble in the treatment material at the treatment temperature. In the instance of treatment by spray, pursuant to my invention, the cellulose or other porous matter treated is preferably at an elevated temperature.

Preferably, as appears, the treatment is carried out in an atmosphere exteriorly of the immersion bath or in which the treated matter is subjected to a spray of the treatment material, at a temperature at or above 115° C.

Further features and objects of the invention will be more fully understood from the following detail description and the accompanying drawing, in which:

Fig. 1 is a perspective view, in diagrammatic form, illustrating cellulose matter treated pursuant to my process, the product represented in this figure being typical of so treated natural cellulose matter such as wood or other vegetable matter, pulp formed therefrom, etc.

Fig. 2 is an elevational view, in diagrammatic form illustrating a hollow object of cellulose constituency treated pursuant to my process, the indicated bottle being typical of various forms of bottomless as well as bottomed objects, the latter serving as a bottle or other container.

Fig. 3 is a perspective view, in diagrammatic form, illustrating a product formed pursuant to my process, the illustration being typical of fabricated products, such as corrugated board and the like, and Fig. 4 is a diagrammatic view, in elevation, indicating certain essential steps in carrying out the immersion method of my invention.

Referring to the drawing illustrating typical products attained pursuant to my invention, and indicative of other products suitable to the attainment of the purposes of my invention:

This application is a continuation in part of my copending application Serial No. 75,929, filed April 23, 1936.

In general, my process comprises treating objects of original natural or artificial cellulose constituency with terpin hydrate or equivalent, with one or more fortifiers, i. e., triphenyl phosphate with or without therewith combining other ingredients, pursuant to my present invention, as by immersion, spraying or other suitable procedure whereby such treatment material penetrates the pores or interstices of such original objects and by impregnation action imparts the characteristics of greatly improved physical attributes inclusive of immunity to water, moisture, oils and other chemicals, and other attributes as appears more fully hereinafter.

Preferably, pursuant to my immersion procedure, the treatment material is heated to a temperature of from 115° C. and upward, in a suitable tank or other container, the object to be treated being immersed in such bath, and upon withdrawal therefrom, the treated object is passed through an atmosphere of elevated temperature, whereupon the product is substantially complete.

Highly satisfactory results are attained by immersing the object in a bath of terpin hydrate, $C_6H_8(CH)_2(CH_3)(C_3H_7)+H_2O$, formed by heating terpin hydrate crystals or powder together with one or more fortifiers i. e., triphenyl phosphate with or without therewith combining other ingredients, pursuant to my present invention, in a suitable container to the temperature of 115° C. or upward. Such container is preferably substantially closed relative to the outer atmosphere, suitable provision being made for the charging of the object into such container for immersion into such bath, the object after immersion being continued in an atmosphere of a temperature of at least 115° C. for a relatively short time period, usually but a few minutes.

My invention is applicable also for treating preshaped objects of cellulose of kindred constituency, such as wood or other natural vegetable matter, or artificial cellulose containing objects by spraying the stated treatment material upon such object, suitable provision being made for heating and maintaining the treatment material and the spray of the treatment material at proper elevated temperature, and, desirably additionally, the faces of the object subjected to the spray.

It is advantageous, in employment of my immersion procedure and spraying procedure, to provide that the treatment material in excess of that absorbed by the treated object, is returned, i. e., in fluid or powder at elevated temperature to the bath or other reservoir containing the supply of the treatment material.

Illustrations of objects of suitable constituency applicable to treatment pursuant to my process are: wood and other plant growths, inclusive of vegetable matter, objects made of pulps of paper, wood, vegetable and other cellulose or cellulose-containing pulp, such as sheets, board, molded objects of such material such as bottles, boxes and other containers, tubes or other hollow rods, solid rods, cellular structures, artificial silk, cellulose, textiles, etc.

By my process, the object treated is enhanced in hardness, that is to say, increased in tensile strength, flexural strength, compression strength, and other physical characteristics imparting strength and rigidity, etc., together with additional attributes as appears more fully hereinafter.

Predicated upon products which I have produced pursuant to my process and upon the results of tests thereon, such hardening and other enhanced attributes are effected by the penetration of terpin hydrate into and within the original cellular and/or porous structure of the treated material and impregnation of the treatment material throughout the treated material, dislodgement and expulsion of moisture and other constituents of natural or artificial cellulose matter, which constituents normally subject cellulose matter to rot or other deterioration, attack by vermin, etc.

Pursuant to my process, "green" wood may be cured by impregnation of my stated treatment material, as herein set forth, the curing operation being completed in the course of a brief time duration, which may be even less than one hour.

Stated generally, terpin hydrate admixed with fortifiers impart the attributes of water-proofness, fire-proofness, and the like.

If desired, waxes and the like may be added to the melted terpin hydrate, such as carnauba wax, ceresin wax, etc., in proportion by weight from two percent (2%) upwardly, to impart a permanent source of polish or gloss, and function to control by proportional quantity the degree of pliability.

Triphenyl phosphate, in proportion by weight from two percent (2%) upwardly, may be employed as a fortifier for rendering the product water-proof, and fire-proof as well as of enhanced hardness, etc. Water-proofness and also alcohol-proofness is attained by employing triphenyl phosphate jointly with cellulose acetate, each in proportion by weight of two percent (2%) upwardly; the maximum triphenyl phosphate-cellulose acetate content is usually less than fifty percent (50%). Zinc acetate, as a fortifier enhances fire resistance and zinc stearate as a fortifier enhances water-proofness. The quality of fire resistance and water resistance is also imparted by employing zinc acetate, triphenyl phosphate, aluminum acetate, aluminum stearate, each in proportion by weight from two percent (2%) upwardly, as fortifiers in combination with terpin hydrate, the latter in proportion by weight from ninety-two percent (92%) downwardly. Usually the proportional content of such fortifiers is less than fifty percent (50%) of the total material.

A product of superior qualities as building material is derived from ply-wood and like laminated cellulose constituency, possessing the strength of natural wood, with moisture-, water-, fire-, vermin- and other desired proofness.

Textiles formed of rayon and other synthetic cellulose matter may be similarly treated for resistance against water absorption, resistance against combustion, the texture of the resulting textile product being controlled in pliability by the addition of suitable plasticizers.

Color, as desired, may be imparted to the treated article, by adding suitable color, such as anilin, vegetable, mineral and other dyes, pigments, etc., to the melted terpin hydrate. Color, viz, anilin, vegetable, mineral or other dyes, pigments, etc., are added in proportional content correspondingly with respect to the depth of color tone desired. Typical admixture of color as a fortifier with terpin hydrate ranges from one to thirty-two proportional part of color to thirteen hundred parts of terpin hydrate, by weight.

Sheets, board, corrugated board, bags, cups and the like, or present commercial and other approved individual products of paper and other cellulose constituency, when treated pursuant to my invention, are transformed into strong and rigid objects, possessing optionally any of the stated additional attributes. Tubes, rods and the like of original paper or wood pulp or other cellulose constituency are transformed into material suitable for commercial uses comparable in strength, weight supporting qualities, resistance against crushing, etc., to like attributes of natural wood, metal and the like, with the added attributes of moisture- and water-proofness, fire-resistance, oil-repellence, vermin-proofness, electrical, heat and sound insulating, etc., as optionally desired. Such treated articles may usefully serve in sheet or board as pie plates, dishes and table ware, wall board, wall panels, shingle material, roofing covering, floor covering, etc., and in hollow forms as bottles, glasses and the like, flower and other pots, conduits for electrical wiring, waste and other fluid conduits, etc.

So-called regenerated celluloses and the like, the so-termed Cellophane being typical, when treated as above set out, retain transparency as well as enhanced in mechanical strength, and rendered water-, moisture- and other fluid-proof, etc., serving as substitutes for panes of glass, glass bottles and other containers, etc. If desired, a degree of translucency, had by selection of proper color added to the treatment material, may be imparted by my process.

Fig. 1 illustrates at 10 a generally solid article typical of substitute lumber, board, tile, block or other unit for wall, floor, ceiling, etc., of buildings, vehicles such automobiles, airplanes, toy vehicles, etc., steamboats, lifeboats, canoes, rowboats, and other navigation vessels, etc., treated pursuant to my invention as elsewhere herein more specifically set forth.

Fig. 2 illustrates at 11 an object, specifically shown as a bottle, but typical generally of hollow objects whether provided with a bottom or not, with variant outer and inner configurations, treated pursuant to my invention as elsewhere herein more specifically set forth.

Fig. 3 illustrates at 12 an object specifically of mechanically cellular structure but typical generally of fabricated non-solid consituency, treated pursuant to my invention as elsewhere herein more specifically set forth.

Fig. 4 diagrammatically indicates an approved type of tank 13 for containing a bath 14 of the treatment material, constituted as more specifically set forth elsewhere herein, which bath may be maintained at the desired elevated temperature by means of a heating element shown diagrammatically at 15, advantageously of electrical type, the electrical wiring being indicated at 16. Such tank is substantially wholly closed to the outer atmosphere, as by a cover, canopy or other form of closure indicated at 16, suitable means of entry as at 13a and of exit as at 13b for the objects to be treated, as for instance by continuous operation upon a series of objects indicated at 17 to be immersed into and conveyed through such bath 14, as by means of an endless chain 18 of conventional or other approved type, suitable mutually spaced breaker rolls being indicated at 19, 20, within such tank 13 to effect the lowered travel of such endless chain 18 to fully immerse such objects 17 below the level 14a of such bath 14; such complete immersion may be positively had by the employment of the supplemental rolls indicated at 21, 21. Breaker rolls are indicated at suitable locations 22 exteriorly of the tank 13 for the desired travel of the endless chain 18 and the propulsion of the same.

Tubes and like objects of paper stock, paper pulp, may be treated pursuant to my invention and transformed into curtain and like supporting rods, waste piping, water and other distribution conduits and the like.

In general, objects of natural cellulose matter in whole or in part fabricated into products of paper, paper pulp, wood pulp, and the like, may be transformed by utilization of my invention into objects possessing controlled enhanced tensile, flexural and compression strength in substitution of metal and like normally rigid materials, or other less rigid materials such as Celluloid, plastics, etc.

Characteristic properties of objects treated pursuant to my invention reside in the complete closure of the normal interstices of the surfaces of the original material and complete closure of inner cells and/or voids, by the impregnated terpin hydrate with or without any stated or other suitable fortifier or fortifiers; further, by my process the surfaces of the treated product are rendered wholly smooth. If an external finish is desired, the treated product requires but simple finishing operation, such as a single sanding operation, to fully prepare the object for any surface finish such as by the medium of shellacs, or varnishes, or oil paints of turpentine, linseeed oil, benzene, mineral spirits as vehicles, or lacquers such as of nitrocellulose, acetyllulose and the like, or of other soluble "cottons", phenol derivative and other synthetic resins, casein, paints, etc.

My treatment material may be employed as a priming coat for the stated materials, rendering the treated object water- and/or fire-proof, etc., applicable for objects subject to water immersion, steam and other moisture exposure, etc.

My treatment materials possess also adhesive properties while in tacky status, thus enabling component parts to be formed of wood, paper or wood pulp, or the like, the component parts after being suitably treated, as aforesaid, for the above stated attributes, are readily formed into the desired final product by mere mechanical assembly.

A characteristic of my invention resides in the feature of imparting non-warping and non-shrinking attributes to the product treated pursuant to my process.

A further characteristic resides in the attribute that the treated product preserves permanently the contour inward as well as outward and all dimensions of the original object treated.

Further objects capable of being produced pursuant to my invention are plates for baking, transporting and serving pies, cakes and the like produced from suitable molded cellulose containing matter.

By my treatment, balsa wood and like natural cellulose matter normally of non-uniform hardness and/or variant porosity have imparted thereto when treated pursuant to my method uniform hardness and full absence of pores and other voids.

Balsa wood when treated pursuant to my invention is rendered germ-free and germ-proof, as well as water-proofed. Balsa wood and like woods may be treated for complete impregnation or partial impregnation, or mere surface impregnation pursuant to the procedures above set forth. White wood, when treated pursuant to my invention, fulfills the requirements of material for heels for ladies' shoes, etc.; the product after immersion bonds readily with coating material such as varnishes, lacquers, etc., by mere application of the same. Dyes, as above set out, may be incorporated with my treatment material, thus affording coloring coincidently with imparting the improved attributes as above enumerated, the product being fully finished as a result of my stated immersion treatment, per se.

Should any high finish be desired of products treated pursuant to my method, the same is attained by mere sanding and/or buffing or like simple procedure.

Such plastic composition may be treated with additional fortifiers, above enumerated, for attaining attributes of enhanced water-proofness, alcohol-proofness, oil-proofness, similarly as above set out with respect to the treatment of pre-shaped cellulose and other fibrous matter.

Objects treated pursuant to my invention may be treated for surface finishing, as by a simple immersion in appropriate baths, such as an aqueous solution of casein and formaldehyde, preferably dilute, or with an aqueous solution of albumen followed by suitable heat treatment or the like for setting of same and/or for rendering the same insoluble and kindred treatment.

Cellulose and kindred material treated as above, attain the above recited attributes attended with substantially no tendency of brittleness. Objects treated pursuant to my invention are substantially devoid of tendency to split, are readily clear bored by any usual or other appropriate boring tool, readily sawed, cut or otherwise severed, readily planed, readily pierced by nails or screws, readily shaped by shaping tools, all without splitting, without surface checking and/or other defects imparted to the treated material by the above operations. In operations of sawing, cutting or other severing the severed faces are finished smooth, free from irregular or jagged edges and free from loose fibers or fragments of the severed material; in fact, the severed faces attain a polished surface by the severing operation, per se.

As indicative of the nature of hardness, coupled with increased tensile strength, increased flexural strength, increased compression strength, I cite the following illustrations.

Commercial 20 pound kraft paper under the Mullin test having an average rupture strength of the order of 40 pounds per square inch, when treated pursuant to my invention has imparted thereto a rupture strength of the order of 140 lbs. per square inch and upwards.

Comercial flower pots molded from pulp of newspaper stock having an average wall thickness of the order of a quarter of an inch, when treated pursuant to my invention readily withstand the weight of a person exceeding 200 lbs., without collapse and in fact without fracture or other permanent deformation of the material. The elasticity of the product imparted by my treatment material functions to restore the object to its former configuration upon release of such imposed load.

A characteristic of my process resides in the attainment of improved hardness and attendant improved tensile, flexural and compression strengths imparted to the object treated, wholly without subjecting the treated article to compression treatment, yielding products pursuant to my method superior to present commercial acceptable plastics and the like, and obviating by my process molds, presses, etc., necessary in the production of present commercial plastics.

An especial application of my invention is the manufacture of electrical wiring, such as single strand, double strand, multiple strand, wiring, cables, etc. In such productions, the individual wire or strand, or plurally, may be helically wrapped by ordinary paper stock, then passed through a bath of my treatment material and by such treatment, per se, the paper has imparted to it the above stated attributes of water-proofness and/or oil-proofness, insulation, and the convolutions of the paper wholly sealed and bonded relative to one another and the paper bonded and sealed with relation to the surface or surfaces of the copper or other metal enwrapped.

My invention is also applicable generally to porous structures, such as Cellotex, artificial wall boards, etc.

As above appears, it is desirable to substantially wholly enclose the tank or other treatment receptacle, as by a cover, canopy or the like, whereby the elevated temperature is maintained within the tank. Preferably, such elevated temperature is at or above the treatment temperature of the treatment material.

Eliminating leakage of the vapors of the treatment material, and for other purposes, it is desirable to provide a zone of relatively reduced temperature, desirably at the top of the interior of the tank, for which purposes I have indicated in Fig. 4, a water, i. e., cooling jacket 16a, formed in or as a part of the cover 16, or which may be formed in or as a part of the top of the tank 13. Inlet and outlet piping for such cooling jacket 16a are indicated at 16b, 16c, for the flow of water or other cooling medium, as will be understood by those skilled in the art.

Whereas, I have described my invention by reference to specific forms thereof, it will be understood that many changes and modifications may be made without departing from the spirit of the invention.

I claim:

1. An object embodying porous matter which is insoluble at elevated temperature in terpin hydrate admixed with triphenyl phosphate, said porous matter having the normal interstices of its constituent parts impregnated with solid terpin hydrate and triphenyl phosphate, said object being non-permeable to water and alcohol.

2. The method of rendering porous cellulosic matter non-permeable to water, alcohol and the like, which porous cellulosic matter is insoluble in the treatment material at treatment temperature, which comprises treating such porous matter with terpin hydrate admixed with triphenyl phosphate at a temperature at or above the melting point of the stated treatment material, the range of proportion of triphenyl phosphate varying from approximately two percent by weight to approximately fifty percent.

3. The method of rendering porous cellulosic matter non-permeable to water, alcohol and the like, which porous cellulosic matter is insoluble in the treatment material at treatment temperature, which comprises treating such porous matter with terpin hydrate admixed with triphenyl phosphate and zinc acetate at a temperature at or above the melting point of the stated treatment material, the range of combined proportion of triphenyl phosphate and zinc acetate varying from approximately two percent by weight to approximately fifty percent.

4. The method of rendering porous cellulosic matter non-permeable to water, alcohol and the like, which porous cellulosic matter is insoluble in the treatment material at treatment temperature, which comprises treating such porous matter with terpin hydrate admixed with triphenyl phosphate and zinc acetate and cellulose acetate at a temperature at or above the melting point of the stated treatment material, the range of combined proportion of triphenyl phosphate and zinc acetate and cellulose acetate varying from approximately two percent by weight to approximately fifty percent.

5. The method of rendering porous cellulosic matter non-permeable to water, alcohol and the like, which porous cellulosic matter is insoluble in the treatment material at treatment temperature, which comprises treating such porous matter with terpin hydrate admixed with triphenyl phosphate and cellulose acetate at a temperature at or above the melting point of the stated treatment material, the range of combined proportion of triphenyl phosphate and cellulose acetate varying from approximately two percent by weight to approximately fifty percent.

6. The method of rendering porous cellulosic matter non-permeable to water, alcohol and the like, which porous cellulosic matter is insoluble in the treatment material at treatment temperature, which comprises treating such porous matter with terpin hydrate admixed with triphenyl phosphate and zinc acetate and aluminum acetate at a temperature at or above the melting point of the stated treatment material, the range of combined proportion of triphenyl phosphate and zinc acetate and aluminum acetate varying from approximately two percent by weight to approximately fifty percent.

7. The method of rendering porous cellulosic matter non-permeable to water, alcohol and the like, which porous cellulosic matter is insoluble in the treatment material at treatment temperature, which comprises treating such porous matter with terpin hydrate admixed with triphenyl phosphate and zinc acetate and zinc stearate at a temperature at or above the melting point of the stated treatment material, the range of combined proportion of triphenyl phosphate and zinc acetate and zinc stearate varying from approximately two percent by weight to approximately fifty percent.

8. The method of rendering porous cellulosic matter non-permeable to water, alcohol and the like, which porous cellulosic matter is insoluble in the treatment material at treatment temperature, which comprises treating such porous matter with terpin hydrate admixed with triphenyl phosphate and aluminum acetate and zinc stearate at a temperature at or above the melting point of the stated treatment material, the range of combined proportion of triphenyl phosphate and aluminum acetate and zinc stearate varying from approximately two percent by weight to approximately fifty percent.

CHRISTOPHER LUCKHAUPT.